United States Patent
Fennel et al.

(10) Patent No.: US 7,209,032 B2
(45) Date of Patent: Apr. 24, 2007

(54) SYSTEM FOR TRANSMITTING TIRE CONDITION VARIABLES

(75) Inventors: Helmut Fennel, Bad Soden (DE); Peter Lohberg, Friedrichsdorf (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 409 days.

(21) Appl. No.: 10/491,742

(22) PCT Filed: Sep. 27, 2002

(86) PCT No.: PCT/EP02/10856

§ 371 (c)(1),
(2), (4) Date: Apr. 5, 2004

(87) PCT Pub. No.: WO03/031210

PCT Pub. Date: Apr. 17, 2003

(65) Prior Publication Data

US 2004/0244474 A1    Dec. 9, 2004

(30) Foreign Application Priority Data

Oct. 4, 2001    (DE) ................................. 101 49 172

(51) Int. Cl.
*B60C 23/00*    (2006.01)
(52) U.S. Cl. ..................... 340/445; 340/442; 340/443; 340/444; 340/447
(58) Field of Classification Search ................ 340/445, 340/442, 443, 444, 447
See application file for complete search history.

(56) References Cited

U.S. PATENT DOCUMENTS

| | | | |
|---|---|---|---|
| 5,190,247 A | 3/1993 | Le Chatelier | |
| 5,231,391 A | 7/1993 | Rigaux | |
| 6,609,419 B1 | 8/2003 | Bankart | |
| 6,742,386 B1 * | 6/2004 | Larson | ....................... 73/146.4 |

FOREIGN PATENT DOCUMENTS

| | | |
|---|---|---|
| EP | 0 806 307 | 1/2001 |
| EP | 1 227 944 | 8/2002 |

* cited by examiner

*Primary Examiner*—Daryl C Pope

(57) ABSTRACT

The present invention relates to a system for transmitting tire condition variables from a transmission device mounted on a motor vehicle to an electronic evaluating or control unit arranged in the area of the vehicle body, which is detachably fastened to a motor vehicle wheel described hereinbelow for providing an electromechanical compound arrangement.

Further, a transmission device is disclosed wherein tire condition variables can be detected, and wherein a coupling device is integrated into the wheel hub (3) and composed of a rotor and a non-rotating stator for producing a field coupling, and its one or more field coupling elements are arranged opposite one another, separated by a narrow air slot (24), and energy and/or signals are coupled by means of electric fields and/or magnetic fields and/or electromagnetic fields.

Still further, the system contains a vehicle wheel equipped with sensors, consisting of wheel rim (1), pneumatic tire (2), and a sensor subassembly (13, 13', 14, 15, 44) which rotates with the wheel. The wheel has a signal connection that can be connected to the transmission device.

26 Claims, 8 Drawing Sheets

SYSTEM FOR TRANSMITTING TIRE CONDITION VARIABLES

BACKGROUND OF THE INVENTION

The present invention relates to a transmission device, a vehicle wheel equipped with sensors, and a system for transmitting tire condition variables.

It is known, among others, from EP-A-0 806 307 to transmit tire condition variables such as pressure or temperature into the interior of a motor vehicle, for example, to an electronic evaluating or control unit. The arrangement described in EP-A-1 227 944 can also measure driving-dynamics tire quantities or wheel condition quantities such as lateral tire force, longitudinal force (wheel torque) or forces that act in a radial direction on the tire (wheel contact force). In both cases, the data to be transmitted is primarily meant for the automated increase of vehicle safety by electronically controlled brake reactions. In addition, there is the possibility of indicating to the driver any information that is interesting to the driver such as about the measured tire pressure, by way of separate display units. Among others, physical conditions such as inside air pressure, air temperature, temperature of the tire rubber, rubber deformations, noise spectra are considered herein as tire condition variables just as well as characteristics or markings such as tire characteristics, from which age, structural shape, type (summer/winter tire) can be taken.

In a tire pressure control system (TPMS) according to EP-A-0 806 307, each of the four wheels comprises an active transmitter, and partly even an additional transmitter in the spare tire. When a number of receiving devices (antenna, receiver) are provided, disadvantageously and assuming usual transmitting field densities, the signal can be received in every receiving device, in the worst case even in a neighboring vehicle, because transmitters generally use the same carrier frequency range. When developing a transmission device for tire condition variables, there is the problem in the application of high-frequency methods that one objective is to achieve a sufficient radius of the service area, while additionally another objective is to appropriately suppress common channel interferences or avoid other undesirable couplings between several transmitters and receiving devices.

SUMMARY OF THE INVENTION

An object of the present invention is to overcome these shortcomings.

This object is achieved by a transmission device comprising one or a plurality of sensor subassemblies which are arranged in a wheel mounted rotatably at the body by way of wheel hub, and with a coupling device integrated into the wheel hub and composed of a rotor and a non-rotating stator for producing a field coupling, and whose one or more field coupling elements are arranged opposite each other, isolated by a narrow air slot, wherein an energy and/or signal coupling takes place by way of electric fields and/or magnetic fields, and/or electromagnetic fields.

The transmission device of the invention, which is also referred to as 'wheel-hub coupler' in the following, is used to transmit signals about tire condition variables from a wheel to an electronic evaluating or control unit arranged in the area of the vehicle body of a motor vehicle. Preferably, this control unit is an existing electronic controlling/regulating unit (ECU) for a motor vehicle brake system (ABS, ESP, etc.).

The transmitted tire condition variables are preferably one or a plurality of the variables air pressure, air temperature, tire temperature, characteristics of the type of tire, characteristics of the tire operating condition, or other wheel parameters that are interesting for a driving dynamics control such as lateral tire force, wheel torque, or tire contact force.

To transmit these characteristic quantities, sensor subassemblies are combined with coupling assemblies and, as the case may be, energy transmitting assemblies in the system of the invention in such a fashion that the desired sensor information can be measured in the rotatably mounted wheel and transmitted into the area of the vehicle body.

A fundamental idea on which the invention is based is the application and technical implementation of per se known general telemetric principles to the problem of transmitting condition variables out of the interior of a motor vehicle tire. The information to be transmitted must be conducted through the tire rubber, especially through the sidewall of the tire. To this end, sending/reception antennas are favorably employed, always having a considerable distance of a minimum of a few centimeters up to a maximum of some meters from each other. Three classes can be distinguished from each other in telemetry. Following formerly usual designations, these classes are the so-called active telemetry, the semi-active telemetry and the so-called passive telemetry. In the active telemetry, e.g. its own battery feeds the transmitter in the area of the sensor system. In the semi-active telemetry, the transmitter stage is supplied with alternating current energy, e.g. through a transformer, which is rectified and used instead of a battery. In the passive telemetry, the 'transmitter' is e.g. an oscillation circuit that is either excited by high-frequency pulse packs or reacts on the transmitter circuit by way of a loose coupling. The electric representation of the condition variable obtained by means of sensors modulates the oscillation circuit in its damping or frequency of resonance. This is detected on the excitation side.

The invention further relates to a vehicle wheel equipped with sensors and comprising a wheel rim, a pneumatic tire and one or more sensor assemblies and/or energy transmitting assemblies rotating with the wheel. In a favorable embodiment of the vehicle wheel that is equipped with sensors, the tire, wheel rim, the measuring device and the components for producing an electric connection form a fixed, non-detachable compound arrangement with the wheel-hub coupler that is fabricated and exchanged as a unit.

This unit is screwed onto a wheel hub with a factory-made and integrated wheel-hub coupler during the assembly or a later exchange. Preferably, an appropriate plug coupling is provided at the wheel and, correspondingly, at the wheel-hub coupler for the further transmission of the tire condition variables to the wheel-hub coupler so that the necessary electric connection is favorably made automatically when the wheel is mounted to the hub.

According to a preferred embodiment, a sensor measuring device is attached in the tread area of the tire, especially to the inside surface of the tire tread. This sensor measuring device is either a unit made up of active or passive electronic components or a strobe applied to the tire tread (mirror, measuring gauge, cross hairs, optically activatable materials, etc.) which is scanned by a beam of the signal transmission subassembly arranged on the wheel rim for determining the desired physical quantity.

Further preferred embodiments of the invention can be gathered from the subsequent description of the Figures serving for a more detailed explanation of the invention.

DETAILED DESCRIPTION OF THE DRAWINGS

Figure 1:
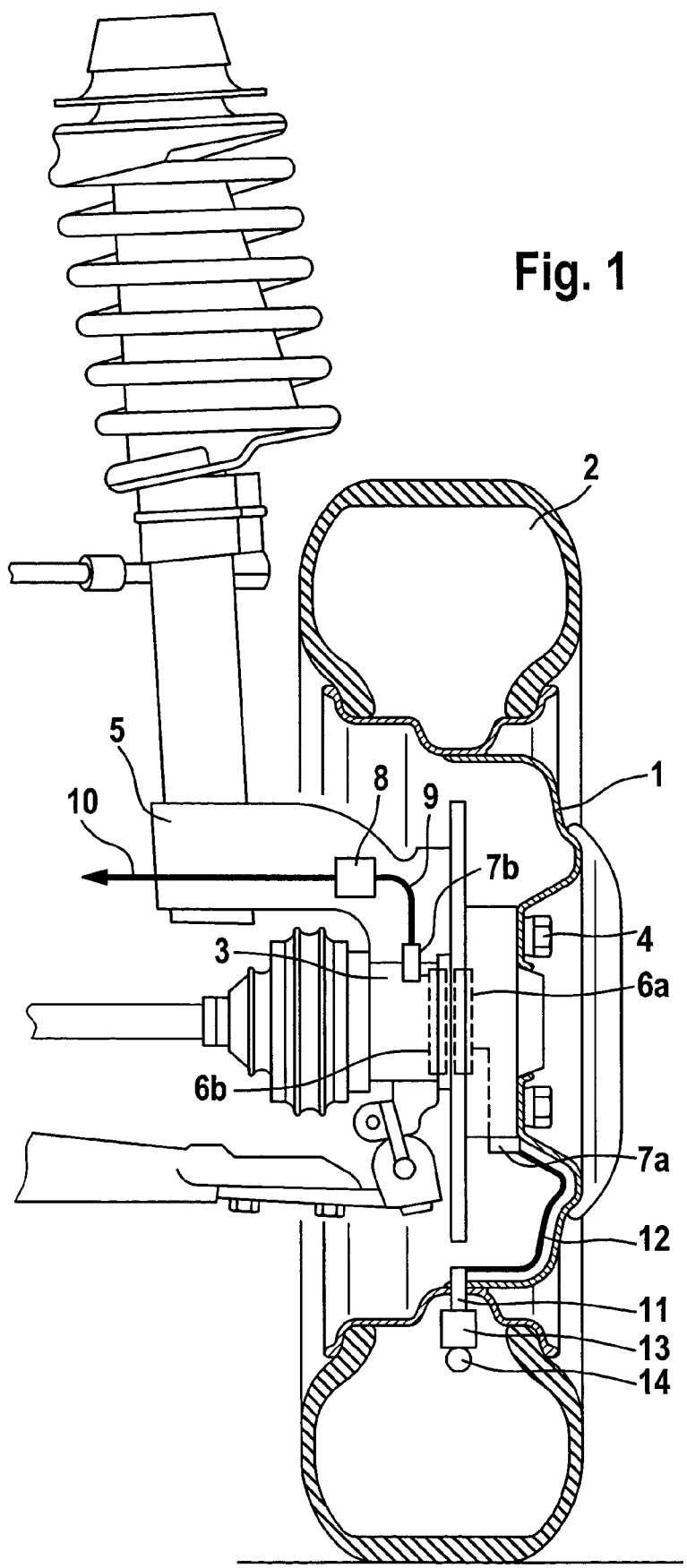
FIG. 1 is a system of the invention for transmitting tire condition variables.

FIG. 1 is a schematic view of a system of the invention for transmitting tire condition variables, which comprises a wheel unit of the invention and a wheel-hub coupler detachably coupled to the wheel and connected to the body of a motor vehicle in a conventional manner. The wheel, composed of rim 1 and pneumatic tire 2, is attached to wheel hub 3 by means of screw 4. Hub 3 comprises at least one or a plurality of bearings and represents the mechanical interface between the rotating wheel and parts 5 stationary with respect to the wheel, e.g. the steering knuckles of the vehicle body. Rotor 6a and a non-rotating stator 6b are integrated into wheel hub 3 for the transmission of the tire condition variables. The electrically effective electromechanical coupling elements are arranged opposite one another in the wheel-hub coupler isolated by only a narrow air slot, and energy and/or signals are coupled by way of electric fields, predominantly however by means of magnetic or electromagnetic fields. The electric access to the wheel-hub coupler is by plug connector 7a on the rotor side and by plug connector 7b on the stator side, with the plug receptacles constituting part of the wheel hub. In the proximity of the wheel hub, at stationary parts 5, a cased electronic subassembly 8 is arranged according to a favorable embodiment, housing electronic circuits for signal conditioning and/or supply of the wheel-hub coupler with alternating current and connected to it by way of plug cables 9. An electric connection 10 is constituted between subassembly 8 and electronic control unit (ECU). Another plug connector 11 is arranged in the wheel rim, said being preferably configured as a plug receptacle and especially as part of the wheel rim forming a rim plug receptacle. Integrated in wheel rim 1 is plug cable 12 electrically connecting wheel-hub coupler and wheel rim plug receptacle with each other. At the inside surface of the wheel rim, connected mechanically and/or electrically to the rim plug receptacle, subassembly 13 is arranged and used for the energy supply of a sensor system or measuring device 14 detecting one or more specific tire condition variables. In subassembly 13, the operating energy for the measuring operation can be made available as active or semi-active energy supply. Corresponding to the principles described above, active energy supply means the use of a battery or a technical apparatus permitting an electric energy production out of the ambience. As is preferred in the invention, the mechanics of wheel movement or its side effects are used, e.g. the wheel rim's rotation or its vibration, but temperature differences and body heat (Seebeck effect) can be used as well. The use of per se known miniaturized mechanical generators is also possible. As another advantageous embodiment, there is the possibility of using piezoelectric foil material for manufacturing an electromechanical transducer. When the foil surface is mechanically bent forwards and backwards in an intermittent motion, this induces electric charges, and the quantity of the charge can be varied by frequency and curve stroke of the intermittent motion and the size of the foil surface. A direct voltage can be produced therefrom in a per se known manner by electronic rectification and smoothing, said direct voltage being able to replace a battery during wheel rotation. A semi-active energy supply exists when alternating current is supplied to the subassembly 13 by way of the wheel-hub coupler. A direct voltage for operation of the measuring device 14 is produced from said alternating current by rectification and smoothing, as has been described hereinabove.

Figure 2:
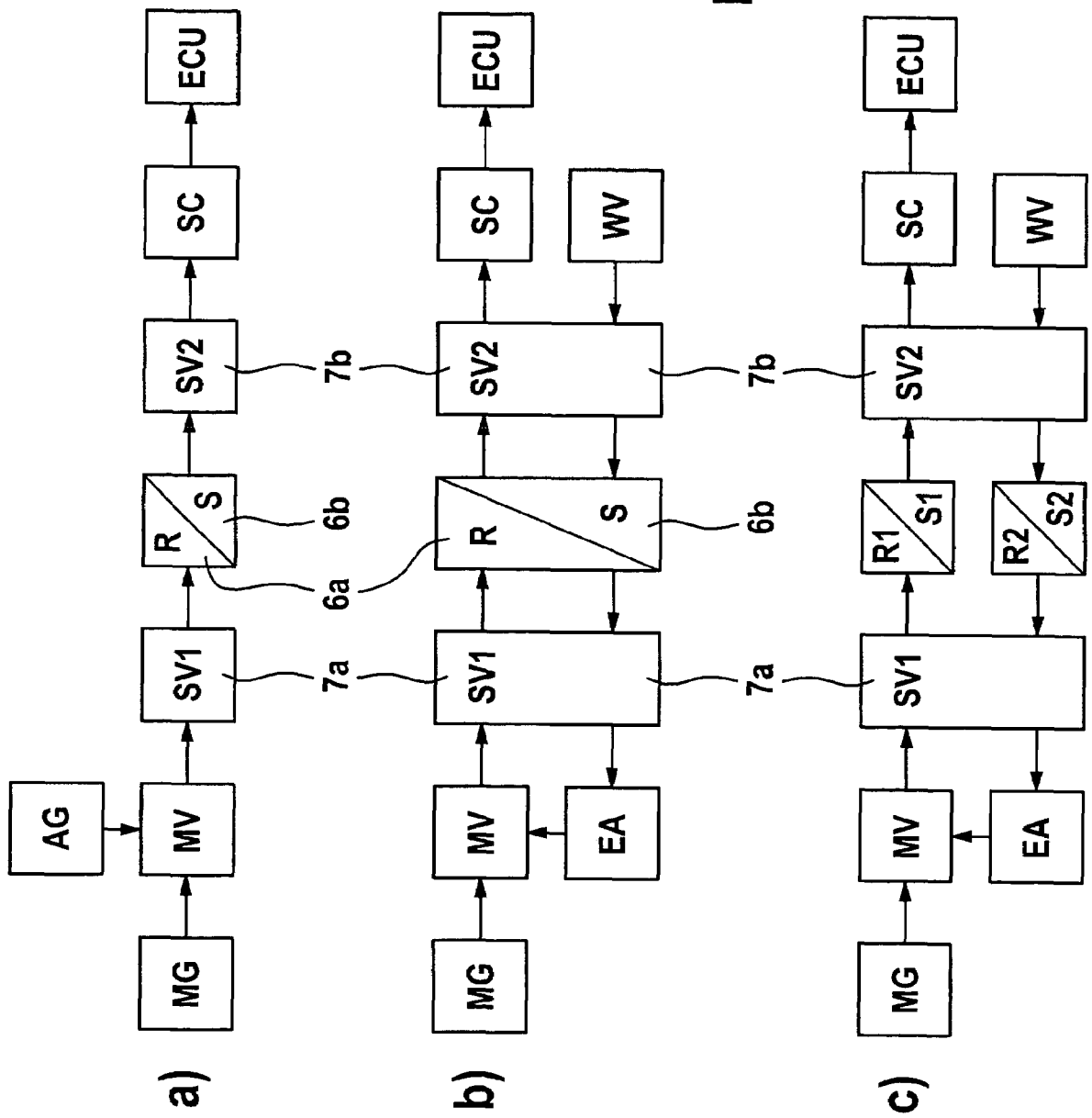
FIG. 2 is a diagrammatic view relating to the application of different energy supply concepts.

Three embodiments for exemplary arrangements with different energy supply concepts are represented in the diagrammatic view in FIG. 2. FIG. 2a) corresponds to an arrangement with active energy supply, and FIGS. 2b) and 2c) exhibit variations of the arrangement with a semi-active energy supply.

The measured quantity MG is detected by the measuring device MV (reference numeral 14 in FIG. 1 or 44 in FIG. 3) in FIG. 2a) with reference to FIG. 1. The necessary operating energy is provided by means of an active direct current supply unit AG (subassembly 13 in FIG. 1). Said supply unit may be a battery or a special generator as indicated above. The measuring signal propagates through plug couplings SV1 (11, 12, 7a) to wheel-hub coupler R/S (6a, 6b) and from there through a plug coupling SV2 (7b) to a signal conditioning stage SC (electronic subassembly 8 in FIGS. 1 and 3) and through a line (line 10 in FIGS. 1 and 3) to an electronic control unit ECU.

In FIG. 2b) the wheel-hub coupler R/S is used in two directions, and the sensed signal passes through the path shown in FIG. 2a) until the control unit ECU. In addition to the first channel of the wheel-hub coupler, a second channel is provided in which the energy propagates through the wheel-hub coupler in the opposite direction and which is used for the semi-active energy supply of the measuring device. Apart from the conditioning stage, an alternating current supply unit WV is additionally arranged in subassembly 8 of FIG. 1 for this purpose, said unit WV being connected to wheel-hub coupler R/S (6b, 6a) by way of the plug coupling SV2 (7b). Plug coupling SV1 (7a, 12, 11) leads to an energy conditioning stage EA in subassembly 13 wherein, as described above, a direct voltage for operation of the measuring device MV (14) is provided after rectification and smoothing operations.

FIG. 2c) shows a variation of FIG. 2b) with the difference that the wheel-hub coupler comprises a separate coupling path R1/S1 and R2/S2 for each coupling direction. An advantage of this variation involves that signal path and energy path can be operated at highly different frequencies and the couplers can be optimized separately for these operating conditions.

Figure 3:
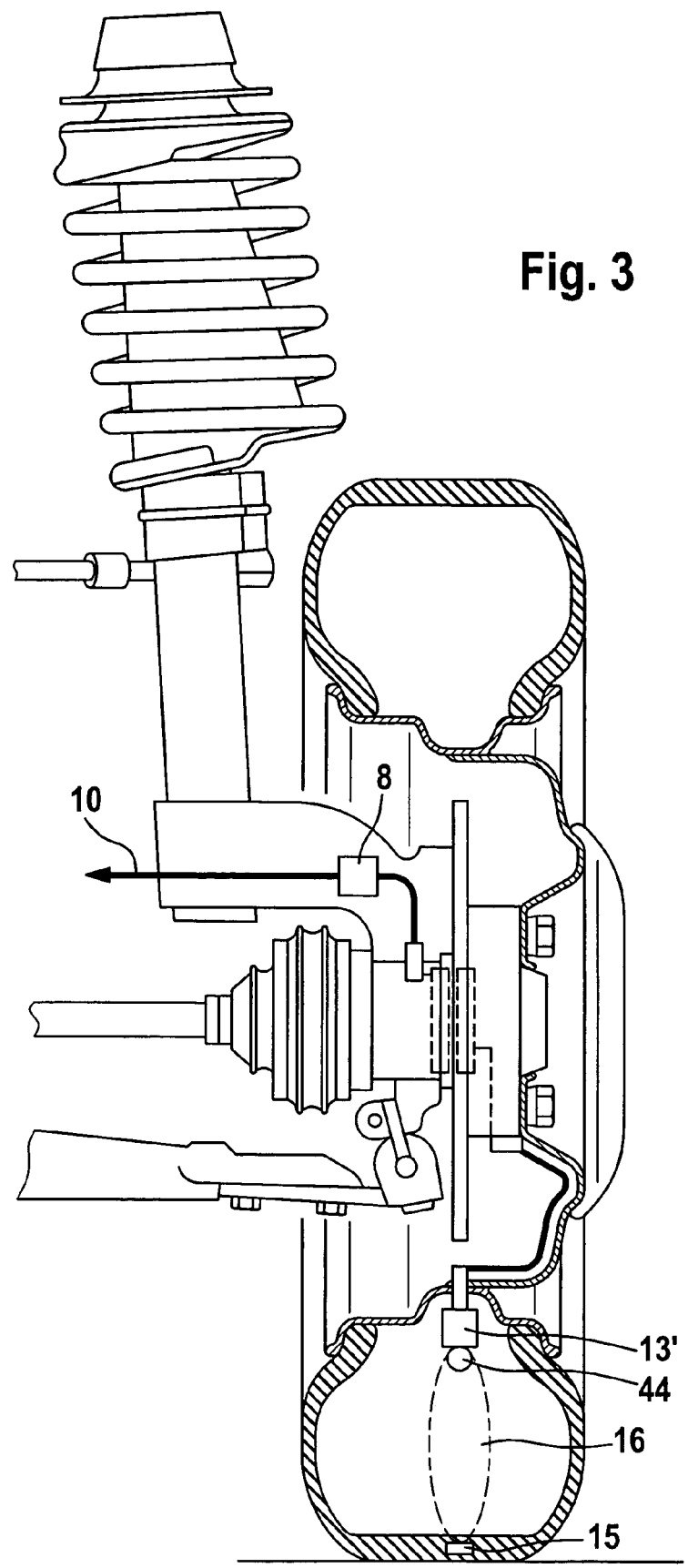
FIG. 3 is a wheel unit in the system of FIG. 1 with a sensor field coupling between tire tread and wheel rim.

FIG. 3 represents a system using, in contrast to the system in FIG. 1, a field coupling 16 for measuring the characteristic tire quantity that is arranged between a sensor measuring device 15, positioned in the tire rubber itself or an the inside surface of the tire, and an electronic sending and/or receiving device 44, with an energy supply unit 13' at the wheel rim interior. Measuring device 15 may e.g. be a sensor arrangement requiring energy for the measurement of the tire condition variable that is to be detected by the sensor.

The arrangement in FIG. 3 makes use of the advantage that, upon rotation of wheel 15 jointly with assemblies 13' and 44, the assemblies maintain an invariable position relative to the inside tire surface so that a signal transmission for the energy and/or data transmission by way of the described field coupling can be executed in a particularly simple manner and with minimum expenditure in field energy.

Figure 4:
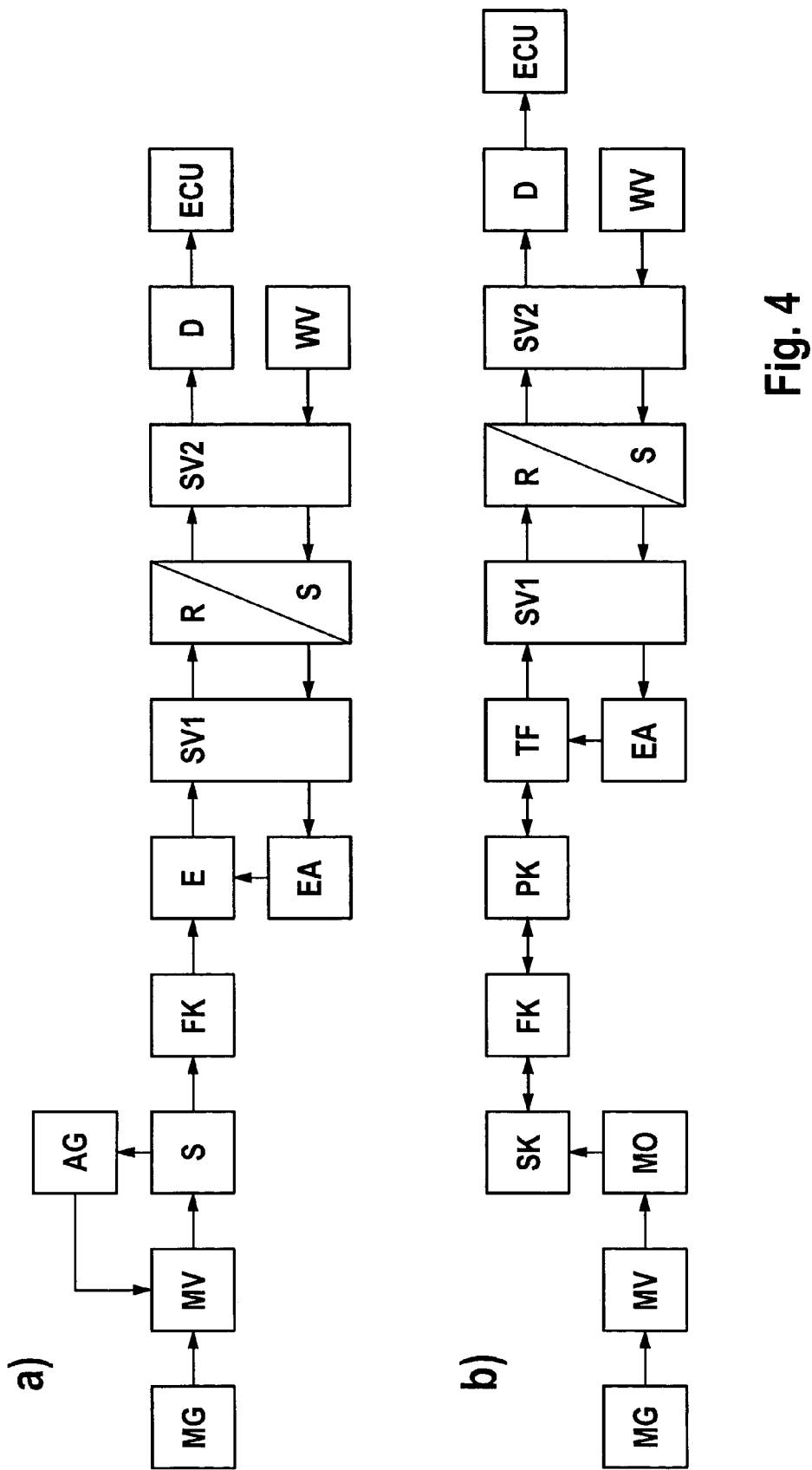
FIG. 4 is a diagrammatic view with various examples for a field coupling inside the tire.

With reference to FIGS. 1 and 3, FIG. 4 shows in a schematic view two embodiments for arrangements with different energy supply concepts.

The illustration in FIG. 4a) corresponds to an arrangement with active energy supply 13', 44 for the transmitter module in the measuring device 15 corresponding to FIG. 3. Receiver module 44 has in this example a semi-passive energy supply by means of subassembly 13'. Measured variable MG is initially detected by measuring device MV. Subsequently, sender S is modulated corresponding to the measured variable. An active direct current supply unit AG supplies the operating energy necessary for this purpose. Said unit can be a battery or a special generator, as indicated above. The transmitting signal propagates through a field coupling FK to the receiver E, thereafter through plug couplings SV to wheel-hub coupler R/S and from there through another plug coupling SV to the signal conditioning stage D and finally to control unit ECU. Wheel-hub coupler R/S is additionally used for the semi-active energy supply of receiver E. An energy conditioning stage EA is used for this purpose, which cooperates with an alternating current supply unit WV in a manner described hereinabove.

An arrangement is illustrated in FIG. 4b) wherein the principle of the passive telemetry is applied for the measured value and the energy supply 13' and for the associated transmitter/receiver module 44. As regards the semi-active energy supply structure and the signal transmission by way of the wheel-hub coupler to the control unit ECU, the arrangement described herein essentially corresponds to the arrangement in partial image a). However, the energy conditioning stage EA herein supplies a sending/receiving device TF exciting with a carrier frequency a primary circuit PK which, in turn, is field coupled (field coupling FK) with a secondary circuit SK so that a modulation MO of this secondary circuit, induced by a measuring signal MV, reacts on the primary circuit PK, which can be detected in the receiver part of TF and is relayed as a detected signal to the wheel-hub coupler. The modulation can be carried out especially by means of damping variations and/or resonance frequency shifts of the secondary circuit SK. The technique of damping variations applicable according to the invention is per se known in the field of high-frequency identification systems (RFID), e.g. in the electronic reading of distinguishing marks of goods in production and trade. The technique of resonance frequency shift may be realized, for example, in that the sensing transducer is mechanically configured as a capacitor, whose capacitance varies in response to the measured variable, with this capacitance constituting part of an electric oscillatory circuit capacitance. Another possibility involves the electric actuation of varactor diodes by means of the measuring signal. The varactor diodes constitute part of an electric oscillatory circuit then. Still another possibility is the application of resonators in a per se known surface wave technique (e.g. quartz surface wave technique). With circuits or components operating according to this principle, it is possible to excite a traveling wave on the surface of the quartz over a distance by sending a high-frequency signal. After a short period, said traveling wave will in turn excite a resonance circuit to send back a high-frequency oscillation whose frequency deviation is measured compared to the frequency of the signal transmitted. The frequency deviation is an indicator of the mechanical deformation of the quartz surface. Therefore, the measuring transducers are designed so that the measured variable deforms the quartz.

Figure 5:
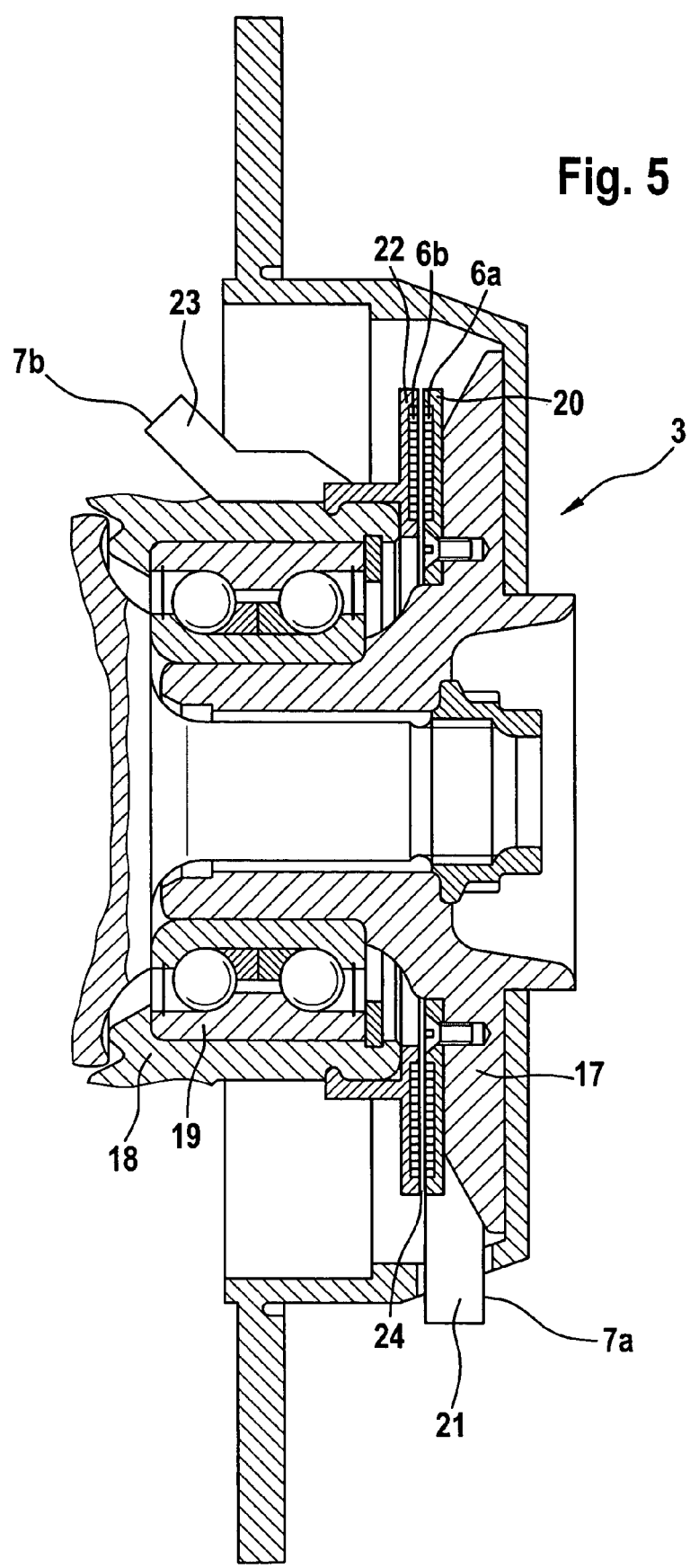
FIG. 5 is a wheel-hub coupler with flat coils.

Rotor 6a and stator 6b of the transmission device ('wheel-hub coupler') of the invention respectively include flat coils (rotor winding 20 and stator winding 22) in FIG. 5. Rotor 6a is fixed to the part of wheel hub 17 pivoted by way of ball bearings 19 and stator 6b is fixed to the stationary part of wheel hub 18. Rotor winding 20 is electrically connected to plug receptacle 21 (cf. 7a in FIG. 1), and stator winding 22 is electrically connected to plug receptacle 23 (cf. reference numeral 7b in FIG. 1). A narrow air slot 24, advantageously in the magnitude of roughly 0.5 mm to roughly 2 mm, exists between stator and rotor. The spiral-type windings of the flat coils are arranged directly opposite each other. The numbers of windings or the inductances of the coils can be adapted in dependence on the frequency range used and the power to be transmitted according to the rules generally known in electrical engineering. The ratio between numbers of windings and impedance adaptation etc. is selected according to the regularities usual with transformers. Depending on the desired transmittable power and/or the desired requirement with respect to a shielding, stator and rotor member in the winding area can be designed as ferritic or sheet-iron half shells or shielding sheet-metal shells, in such a fashion that these shells encompass the windings jointly in the way of a shell core with air slot. This achieves an optimum between transmission efficiency and shielding effect. Further, the invention covers a preferred embodiment for realizing a double wheel-hub coupler according to FIG. 2c, wherein only one stator and rotor member is respectively employed. In this embodiment, two separate windings are respectively fitted in rotor and stator. This is advantageous because windings as well as ferritic, iron or shielding sheet-metal shells can be chosen separately for the two transmission directions.

Figure 6:
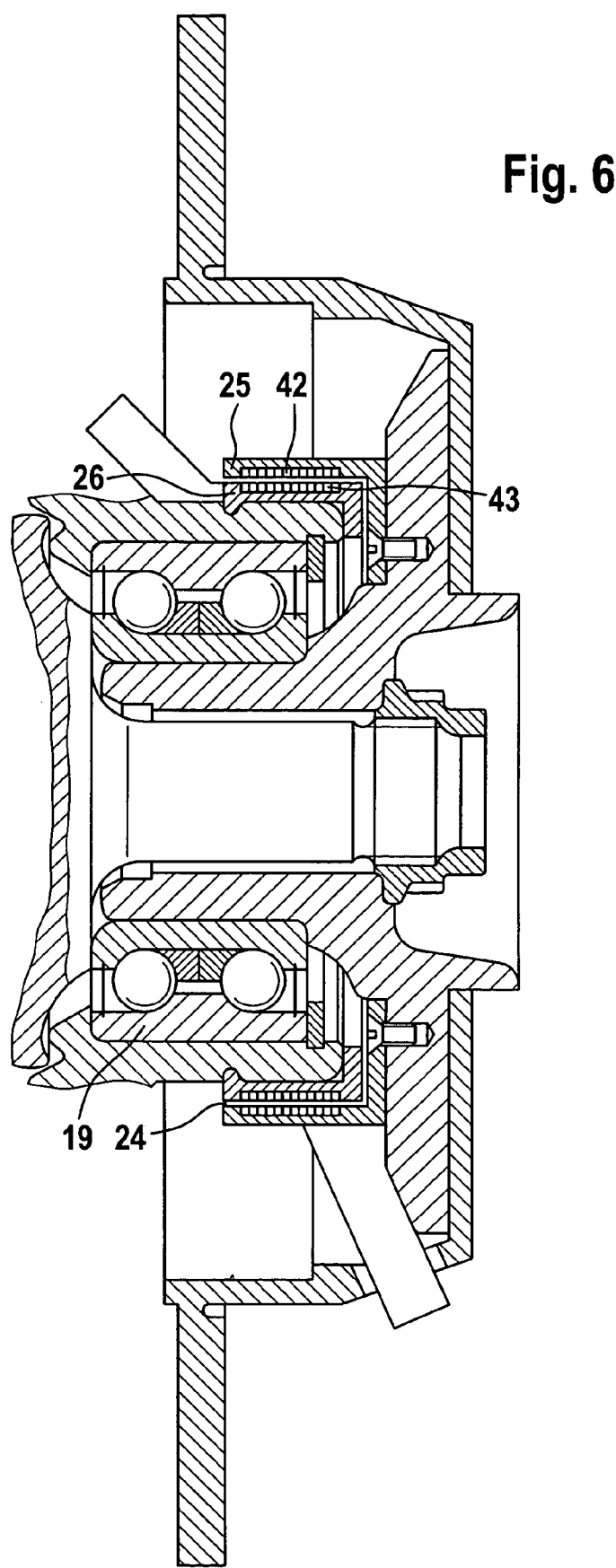
FIG. 6 is a wheel-hub coupler with cylinder coils.

FIG. 6 shows another example for a wheel-hub coupler of the invention, which in contrast to FIG. 5, employs cylindrical coils 42, 43 for the signal coupling operation which are embedded in rotor 25 and stator 26. Cylindrical coils 42 and 43 embrace each other concentrically, again by producing an air slot 24. The above-mentioned rules for numbers of windings, designs with ferritic or iron or shielding shells apply similarly also to the wheel-hub coupler shown in FIG. 6.

Figure 7:
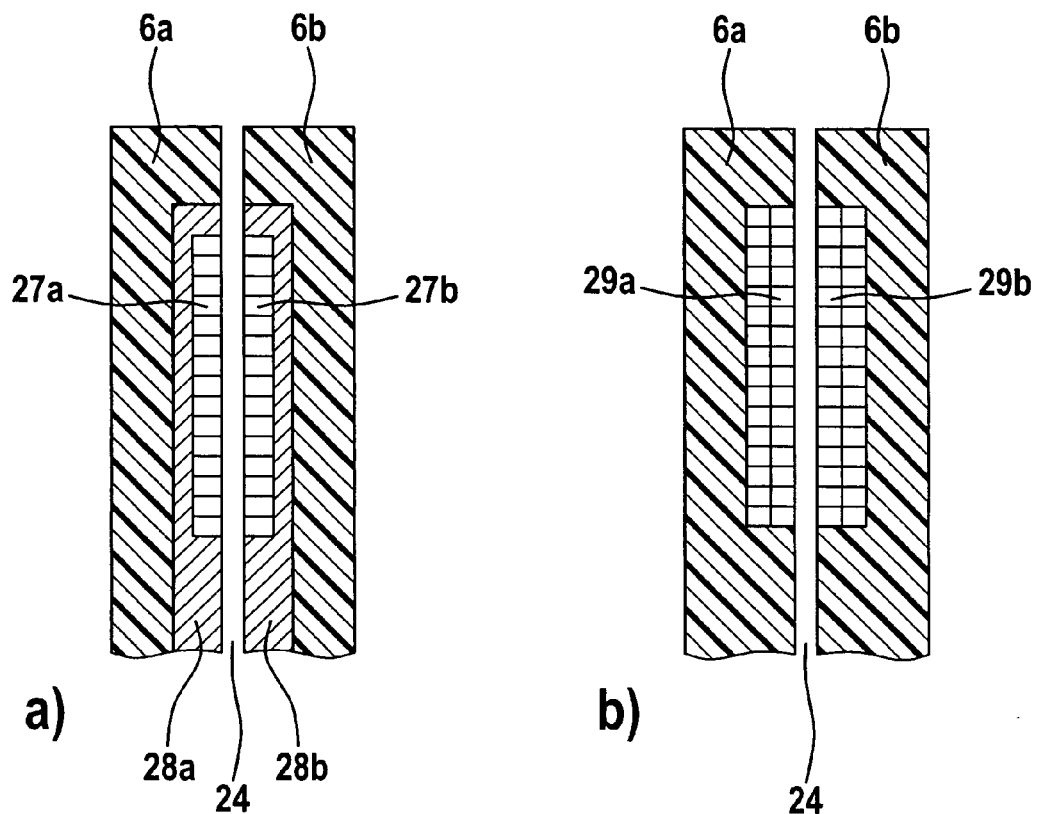
FIG. 7 shows various coupling variations in a wheel-hub coupler.
Figure 7:
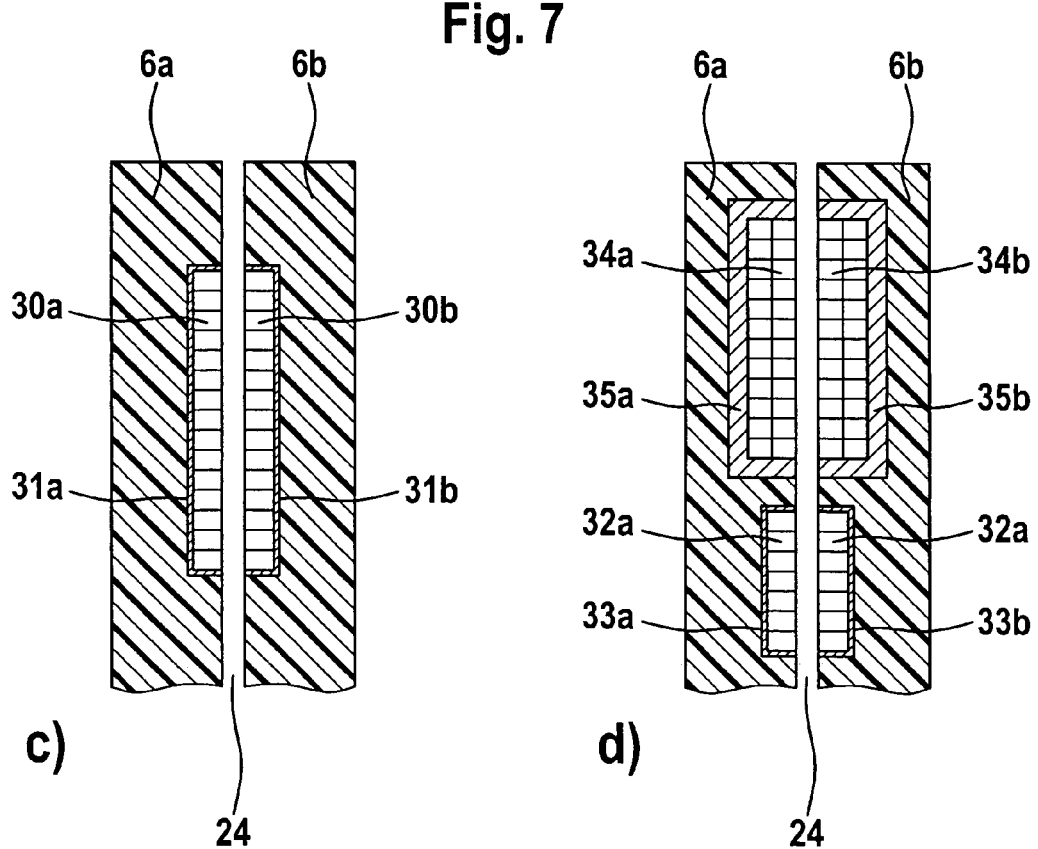

FIG. 7 depicts partial images a) to d) of examples for different embodiments of stator/rotor coupling windings which can be used in the wheel-hub couplers described hereinabove. In all illustrated examples the base members 6a, 6b of rotor and stator are made of electrically and magnetically non-conductive solid plastics. FIG. 7a shows the cutout of a wheel-hub coupler with two single-layer windings 27a, 27b embedded in shells made of ferrite 28a, 28b. The ferritic material is chosen such that a high effectiveness of coupling is produced in the frequency range to be transmitted and, additionally, a magnetic shielding effect with regard to the outside space of the windings is achieved. FIG. 7b shows the cutout of a wheel-hub coupler with two multi-layer windings 29a, 29b directly embedded in the associated base members. FIG. 7c shows the cutout of a wheel-hub coupler with two single-layer windings 30a, 30b embedded in shielding sheet-metal shells 31a, 31b. FIG. 7d shows the cutout of a double wheel-hub coupler with two single-layer windings 32a, 32b embedded in shielding sheet-metal shells 33a, 33b. 34a and 34b designate two multi-layer windings embedded in ferritic shells 35a, 35b. Windings 32a, 32b are used to couple a signal with a higher frequency from the rotor to the stator than windings 34a, 34b which are used to transmit alternating current energy of a lower frequency.

Figure 8:
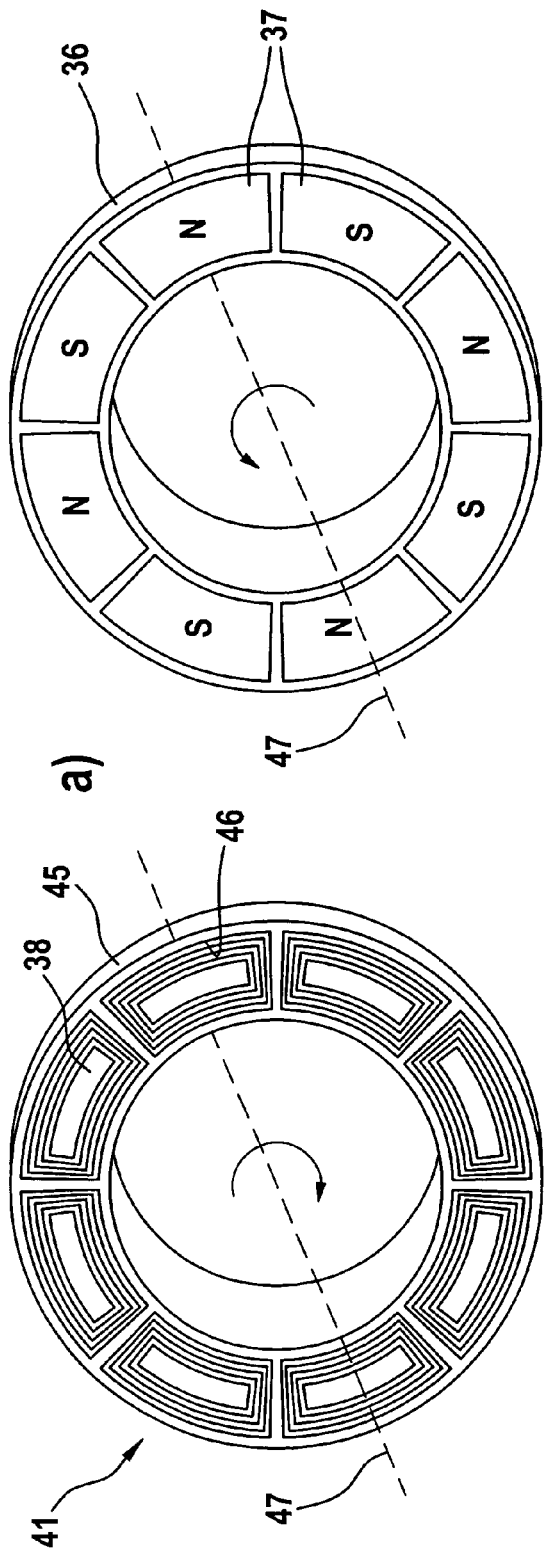
FIG. 8 shows a wheel-hub coupler with an integrated dynamo.
Figure 8:
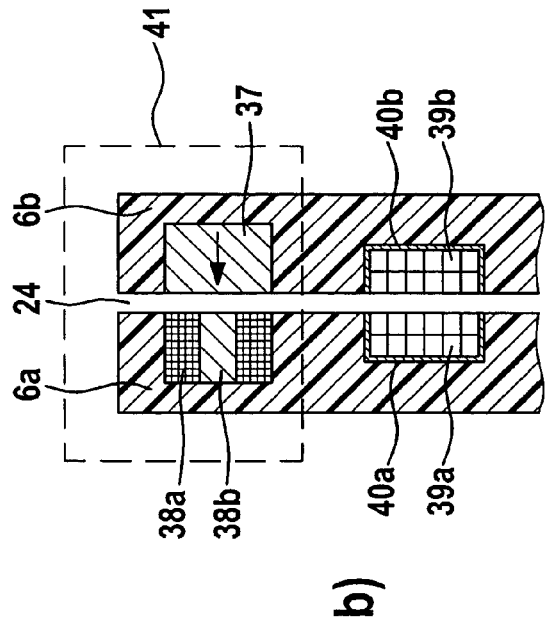

FIG. 8 shows an embodiment of the invention wherein a dynamo 41 for generating a supply voltage for the operation of the subassemblies 13 and 14 or 13' and 44 is additionally integrated into the wheel-hub coupler. Partial image a) exhibits the principle of a simple disc-shaped alternating current generator comprised of a ring 36 that includes on its circumference permanent-magnetic segments 37 in alternating polarity (N=north pole, S=south pole). Arranged opposite ring 36 is ring 45, which is composed of several flat coils 46 with iron cores 38 that are also arranged annularly. When ring 45 is moved with respect to ring 36 for producing energy, in particular is rotated about a common axis 47, an induction voltage will be produced in the coils and used for the provision of electric energy. Series and/or parallel connection of the various coil sections 38 provided in the ring permits adapting the capacity to the subassemblies 13, 14 or 13', 44. FIG. 8b) is a schematic view of the integration of a like dynamo in a wheel-hub coupler. Coil arrangement 38a with iron cores 38b is embedded in rotor side 6a (FIG. 5), and magnet arrangement 37 is arranged in stator side 6b (FIG. 5). The signal transmission device with windings 39a, 39b and shieldings 40a, 40b is arranged below dynamo 41.

The invention claimed is:

1. A transmission device for motor vehicles for transmitting signals about tire condition variables from a wheel to an electronic evaluating or control unit arranged in an area of a vehicle body, comprising
at least one sensor subassembly (14, 15, 44) for the detection of tire condition variable, the at least sensor subassembly being arranged in a wheel mounted rotatably at the body by way of wheel hub (3), and
a coupling device integrated into the wheel hub and composed of a rotor and a non-rotating stator for producing a field coupling, and including field coupling elements (20, 22, 27a, 27b, 29a, 29b, 30a, 30b, 34a, 34b, 39a, 39b, 42, 43) arranged opposite each other, isolated by a narrow air slot (24),
wherein the wheel has a tire with a tread area and the at least one sensor subassembly is mounted in the tread area of the tire,
wherein a rotating part of a coupling device for establishing an electrically conductive and detachable connection of the sensor device with a non-rotating part of the coupling device is arranged in the vehicle wheel,
and wherein an energy supply subassembly (13', 44) cooperates with the at least one sensor subassembly (15) stationarily fixed in the tread area of the tire by way of a field coupling (16) for the energy supply of the measuring device, wherein the transmission of energy occurs in the way of a transponder.

2. The device as claimed in claim 1,
further comprising plug connectors on the rotor side and the stator side.

3. The device as claimed in claim 1,
further comprising an integrated electromechanical coupling device (6a, 6b) on the wheel hub (3).

4. The device as claimed in claim 1,
further comprising a cable-type electric signal plug coupling (7a, 11, 12) from the wheel hub to a pick-up for measuring data.

5. The device as claimed in claim 1,
wherein the coupling device comprises flat coils, composed of a rotor with rotor winding (20) and a stator with stator winding (22).

6. The device as claimed in claim 1,
wherein the coupling device is constructed with cylinder coils embracing each other, composed of a rotor (25) with an integrated rotor winding and a stator (26) with an integrated stator winding.

7. The device as claimed in claim 1,
wherein stator and rotor of the coupling device are mechanically connected to parts at least one ball bearing (19) installed into the wheel hub.

8. The device as claimed in claim 1,
wherein the base members of rotor and stator are made of an electrically and magnetically non-conductive material.

9. The device as claimed in claim 1,
wherein the coupling device is designed with two single-layer windings (27a, 27b) embedded in ferritic shells (28a, 28b).

10. The device as claimed in claim 9,
wherein the coupling device is designed with multi-layer windings (29a, 29b) directly embedded in the associated base members.

11. The device as claimed in claim 10,
wherein the coupling device is designed with two windings (30a, 30b) embedded in shielding sheet-metal shells (31a, 31b).

12. The device as claimed in claim 11,
wherein the coupling device is designed with two windings (32a, 32b) embedded in shielding sheet-metal shells (33a, 33b) and two additional windings (34a, 34b) embedded in ferritic shells (35a, 35b).

13. The device as claimed in claim 12,
further comprising a dynamo (41) integrated into the coupling device for producing a supply voltage for the operation of the electronic circuit in the sensor subassembly.

14. The device as claimed in claim 13,
wherein the dynamo is made up of a ring of permanent-magnetic segments (37) on the stator side and coil arrangements (38a) with iron cores (38b) on the rotor side.

15. The wheel as claimed in claim 1,
wherein the sensor subassembly comprises a sensor element (14, 15, 44) and a signal transmission subassembly (13, 13'), wherein the sensor element and the signal transmission subassembly are integrated into a joint element.

16. The wheel as claimed in claim 1,
wherein the sensor subassembly comprises at least one sensor with an electronic circuit for conditioning sensor signals.

17. The wheel as claimed in claim 1,
wherein the at least one sensor subassembly (15) is integrated into the tire.

18. The wheel as claimed in claim 1,
wherein an energy transmission subassembly (13', 44) is provided for the energy supply of at least one sensor subassembly (15).

19. The wheel as claimed in claim 1,
wherein the sensor subassembly is supplied with direct current energy by means of a battery integrated into the sensor subassembly.

20. The wheel as claimed in claim 1, wherein a signal transmission subassembly (13', 44) cooperates with a sensor subassembly (15) stationarily fixed in the tread area of the tire by way of a field coupling (16) for the signal transmission of the measuring device.

21. The wheel as claimed in claim 1, wherein a generator integrated into the sensor subassembly supplies the sensor subassembly (15) with direct current energy.

22. The wheel as claimed in claim 1, wherein a cable is integrated into the wheel rim having a plug as output towards the coupling device and a wheel rim plug receptacle on the tire side which latter permits an electromechanical plug coupling towards the tire's interior and in which the sensor subassembly can be slipped on and fixed in an electromechanically stationary fashion.

23. The wheel as claimed in claim 22, wherein the wheel rim plug receptacle is stationarily integrated into the wheel rim member in such a fashion that it projects into the tire's interior in an air-tight manner.

24. The wheel as claimed in claim 1, wherein the sensor subassembly produces tire condition signals by means of electronic sensor means and relays the signals by way of the coupling device to another electronic device.

25. The wheel as claimed in claim 1, wherein the tire condition variables relate to at least one quantity out of a group of quantities consisting of air pressure, air temperature and tire temperature.

26. The wheel as claimed in claim 1, wherein the tire condition variables relate to at least one quantity out of a group of quantities consisting of the type of tire and operating conditions of the tire.

* * * * *